United States Patent [19]
Hicks et al.

[11] Patent Number: 5,327,935
[45] Date of Patent: Jul. 12, 1994

[54] THREE-WAY VALVE WITH PRESSURE BALANCED PLUG MEMBER

[76] Inventors: Prentiss C. Hicks, 7350 SW. Landmark La., Tigard, Oreg. 97224; Thomas E. Ray, 22151 SW. Ferguson Rd., Beavercreek, Oreg. 97004

[21] Appl. No.: 27,755

[22] Filed: Mar. 8, 1993

[51] Int. Cl.⁵ .............................................. F16K 11/08
[52] U.S. Cl. .................... 137/625.41; 251/283
[58] Field of Search ................ 251/283; 137/625.41

[56] References Cited

U.S. PATENT DOCUMENTS 3,193,245  7/1965  Parker ............................ 251/283 X
3,774,634  11/1973  Bonney ........................... 251/283 X
4,055,324  10/1977  Hughes et al. ................. 251/317 X

FOREIGN PATENT DOCUMENTS 658229  6/1929  France ............................ 251/283

Primary Examiner—John C. Fox
Attorney, Agent, or Firm—James D. Givnan, Jr.

[57] ABSTRACT

A three-way valve for high pressures and having a plug member rotatable within a valve housing. A seal arrangement is offset from the plug member to define a space in which system fluid pressure may be trapped for the purpose of acting on the plug member to offset system fluid pressure applied in an opposite direction to the plug member. Accordingly, frictional engagement of the plug member with the valve housing is reduced.

1 Claim, 1 Drawing Sheet

THREE-WAY VALVE WITH PRESSURE BALANCED PLUG MEMBER

BACKGROUND OF THE INVENTION

The present invention pertains generally to valves used in high pressure systems where substantial loads are applied to the movable element of the valves.

In valves controlling fluid flows above 1000 PSI a problem exists by reason of the movable valve member being heavily biased, often by pressure in a downstream line, against a surface of the valve body. Accordingly, considerable torque may be required to position the plug member or other movable member of the valve. Valves actuated by mechanical or pneumatic actuators accordingly may require an actuator of a size incompatible with the space available. In the past, valve plug members have been coated to provide a lubricated surface between a valve housing surfaces and the movable plug member. Such reliance on a surface applied lubricant encounters the risk of contaminating a fluid flow through the valve.

U.S. Pat. Nos. 4,705,075 and 5,037,067 issued to one of the present inventors are of interest in that they disclose plug valves for use in high pressure systems.

SUMMARY OF THE PRESENT INVENTION

The present invention is embodied within a valve having a movable member balanced against system pressure by the trapping of fluid pressure in a space located so as to counterbalance system pressure applied directly to the movable member.

The present valve includes a plug member having a central bore which receives pressure from trapped fluid in a downstream line. The plug member is accordingly biased in an axial direction. A pressurized zone is provided at the opposite end of the plug member, remote from the pressure source, in which pressure build up occurs which imparts a force to the plug member acting oppositely to directly applied system fluid pressure. A circular seal is supported in place by a retainer carried by a valve stem.

The moveable member of the valve is in a state of equilibrium or at least partially so that forces required for actuation of the moveable member are minimal. Accordingly, the size and power output of actuating devices for such valves may be greatly reduced as friction is largely nonexistent.

Important objectives of the present invention include the provision of a zone located opposite from that side of a moveable valve member subjected to direct system pressure with said zone pressurized to oppose system fluid pressure acting on the valve member; the provision of a three-way valve for use in high pressure environments exceeding 1000 PSU and which, even when subjected to such pressures, has a low torque requirement.

DETAILED DESCRIPTION OF THE PREFERRED EMBODIMENTS

Figure 1:
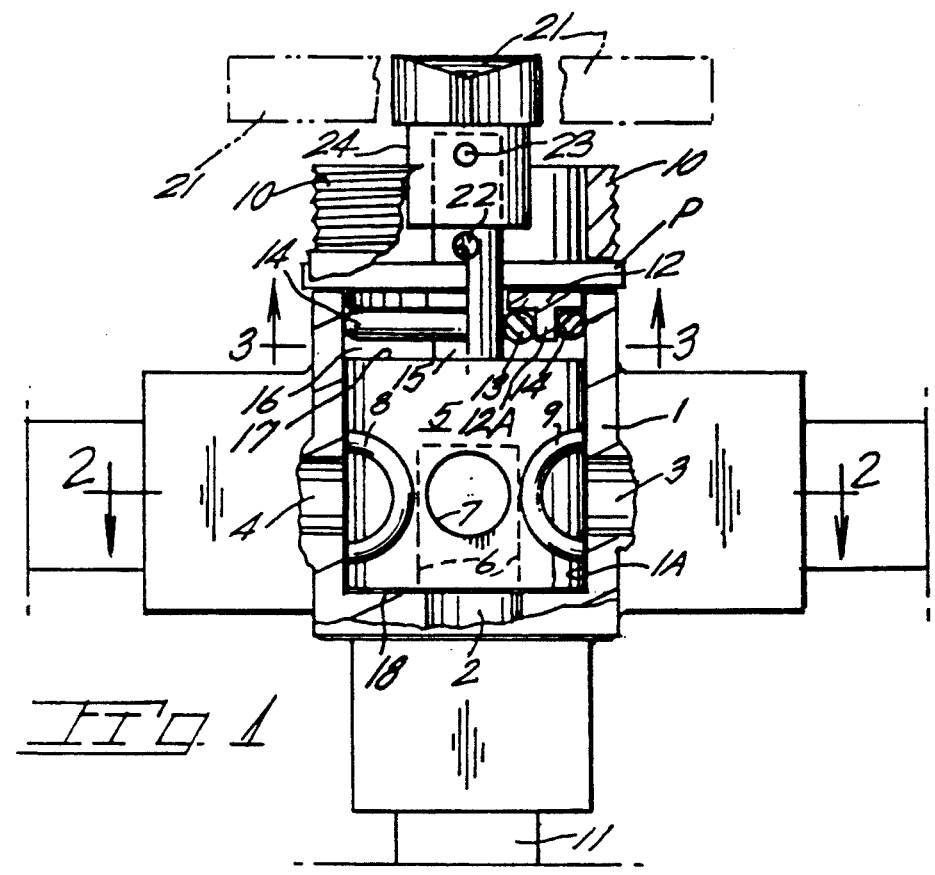
FIG. 1 is a front elevational view of a valve embodying the present invention with fragments broken away for purposes of illustration.
Figure 2:
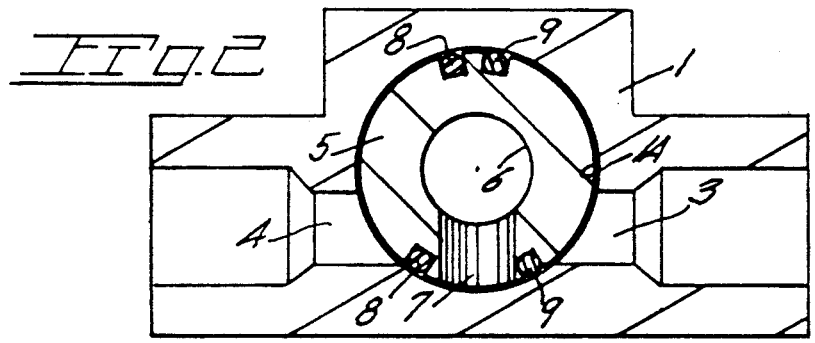
FIG. 2 is a horizontal sectional view taken downwardly along line 2—2 of FIG. 1.
Figure 3:
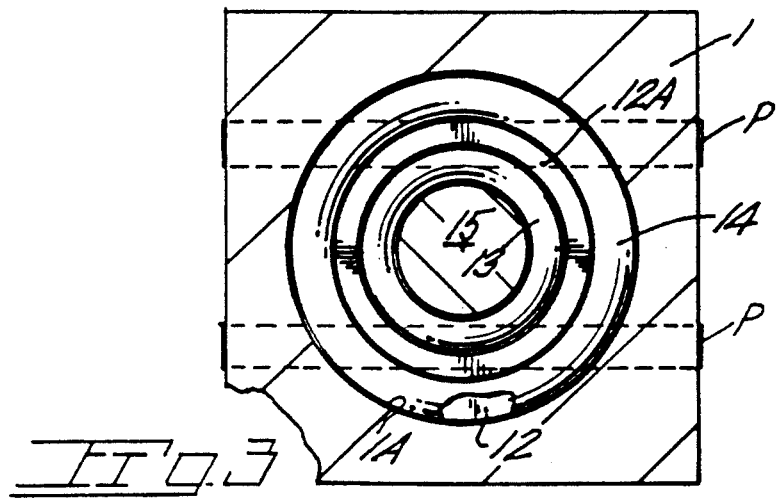
FIG. 3 is a horizontal sectional view taken upwardly along line 3—3 of FIG. 1.

With continuing attention to the drawings, wherein applied reference numerals indicate parts similarly hereinafter identified the reference numeral 1 indicates a valve body of a three-way valve having inlet ports 3 and 4 and an outlet port 2 each in communication with fluid pressure conduits. Outlet port 2 may be pressurized by back pressure in associated conduit 11.

A plug member at 5 is rotatably housed in a chamber defined by internal wall 1A of valve body 1 and defines an inlet bore 6 which terminates in communication with the radial passageway 7. The plug member is preferably provided with the O-ring receiving groove structure shown and described in U.S. Pat. No. 5,037,067 which structure effects O-ring retention in the presence of a high pressure drop across the O-ring. Rotation of plug member 5 about the rotational axis of same brings passageway 7 into communication with either of the valve body ports 3 and 4. Plug carried O-rings at 8 and 9 in place in plug member channels serve to isolate system pressure or back pressure and entry of same into port 3 or 4 not being in direct communication with passageway 7 of the plug member. A threaded end 10 on valve body 1 enables the valve body to be attached to a support.

The foregoing is by way of describing a three way valve on which the present invention described below may be utilized.

Offset axially from plug member 5 are seal means including a seal retainer or holder at 12 on which multiple, circular seals at 13 and 14 shown as O-rings, are carried to provide sealing engagement with a valve stem 15 and with internal wall 1A respectively. Retainer 12 is centrally apertured to slidably receive stem 15. An annular wall 12A on the retainer holds the O-rings in place. Fluid pressure is confined against escape by first and second seals 13-14 to cause a zone at 16 to be pressurized at or near system pressure passing between plug member 5 and chamber wall 1A. Pressure in zone 16 bears against a plug member end wall at 17 to counterbalance system fluid pressure applied directly to the opposite or remaining plug end wall at 18. Pins P in valve body 1 confine retainer 12 against axial displacement by pressure in zone 16. Stem 15 terminates in a handle 21 or, in other valve arrangements, an actuator mechanism coupled to the stem. A set screw 23 secures a collar 24 of the handle to stem 15. A pin 22 on the stem projects therefrom to serve to limit stem rotation and index passageway 7 of the plug member into communication with ports 3 and 4. Pin 22 rides in an arcuate groove in valve body 1.

While we have shown but one embodiment of the invention, it will be apparent to those skilled in the art that the invention may be embodied still otherwise without departing from the spirit and scope of the invention,

Having thus described the invention, what is desired to be secured by a Letters Patent is:

1. A three-way plug valve for use in a high pressure system and having a pressure balanced plug member and comprising,
    a valve body having an internal wall defining a chamber, side walls defining side ports and an end wall defining a port,
    a rotatable cylindrical plug member housed in said chamber and defining a central bore in communication with said end wall port and a radially directed passageway terminating at the plug member outer periphery for selective direct communication with said side ports, a first end wall and a second end wall oppositely disposed on said plug member, a stem on said plug member projecting from said first end wall surface, a control member on said stem, seal means in said chamber of the housing and offset from said first end wall of the plug member to define a space therewith in which pressure may be confined to exert a force on said plug member to balance pressure applied in an opposite direction on said second wall of the plug member, and said seal means comprises multiple circular seals, a retainer disposed about said stem, said multiple seals in place on said retainer one each for engagement with said stem and said internal wall of the valve body to confine pressure in said space for purposes of balancing forces acting on said second end wall, said valve body including pins confining said retainer against axial displacement.

* * * * *